(12) United States Patent
Aikata

(10) Patent No.: US 11,088,425 B2
(45) Date of Patent: Aug. 10, 2021

(54) ENERGY STORAGE DEVICE

(71) Applicants: GS Yuasa International Ltd., Kyoto (JP); Robert Bosch GmbH, Stuttgart (DE)

(72) Inventor: Riku Aikata, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 113 days.

(21) Appl. No.: 15/760,611

(22) PCT Filed: May 10, 2016

(86) PCT No.: PCT/EP2016/060446
§ 371 (c)(1),
(2) Date: Mar. 15, 2018

(87) PCT Pub. No.: WO2017/045776
PCT Pub. Date: Mar. 23, 2017

(65) Prior Publication Data
US 2018/0254466 A1    Sep. 6, 2018

(30) Foreign Application Priority Data

Sep. 18, 2015 (JP) ............................. JP2015-186088

(51) Int. Cl.
| | |
|---|---|
| *H01M 50/538* | (2021.01) |
| *H01M 10/0587* | (2010.01) |
| *H01M 50/10* | (2021.01) |
| *H01M 50/15* | (2021.01) |
| *H01M 50/155* | (2021.01) |
| *H01M 50/172* | (2021.01) |
| *H01M 50/528* | (2021.01) |
| *H01M 50/543* | (2021.01) |
| *H01M 10/0525* | (2010.01) |
| *H01M 50/60* | (2021.01) |

(52) U.S. Cl.
CPC ..... *H01M 50/538* (2021.01); *H01M 10/0525* (2013.01); *H01M 10/0587* (2013.01); *H01M 50/10* (2021.01); *H01M 50/15* (2021.01); *H01M 50/155* (2021.01); *H01M 50/172* (2021.01); *H01M 50/528* (2021.01); *H01M 50/543* (2021.01); *H01M 50/60* (2021.01); *H01M 2220/20* (2013.01)

(58) Field of Classification Search
CPC .... H01M 2/0473; H01M 2/22; H01M 50/538; H01M 50/15; H01M 50/172; H01M 50/528; H01M 50/543; H01M 2/0482
See application file for complete search history.

(56) References Cited

U.S. PATENT DOCUMENTS

| | | | |
|---|---|---|---|
| 2008/0107962 A1* | 5/2008 | Uh | H01M 10/4257 429/164 |
| 2012/0321943 A1 | 12/2012 | Ito | |
| 2014/0030587 A1* | 1/2014 | Tsuruta | H01M 2/0473 429/179 |
| 2014/0255767 A1 | 9/2014 | Mashiko et al. | |
| 2015/0017501 A1 | 1/2015 | Harayama | |
| 2018/0269457 A1* | 9/2018 | Kawate | H01M 50/538 |

FOREIGN PATENT DOCUMENTS

| | | |
|---|---|---|
| JP | 2010-097822 A | 4/2010 |
| JP | 2010-212240 A | 9/2010 |
| JP | 2016-197515 A | 11/2016 |

OTHER PUBLICATIONS

International Search Report (ISR) (PCT/ISA/210), in PCT/EP2016/06446, dated Jul. 25, 2016.

* cited by examiner

*Primary Examiner* — Ladan Mohaddes
(74) *Attorney, Agent, or Firm* — McGinn I.P. Law Group, PLLC.

(57) ABSTRACT

An energy storage device includes: an electrode assembly; a case configured to store the electrode assembly; a conductive member electrically connected to the electrode assembly; a first insulating member disposed between a wall of the case and the conductive member; and a projection protrudingly provided on the wall on an opposite side to the first insulating member, wherein the first insulating member has a first engaging portion configured to engage with a limiting portion, the limiting portion being a portion of a recess formed on the wall on an opposite side to the projection.

12 Claims, 10 Drawing Sheets

ENERGY STORAGE DEVICE

TECHNICAL FIELD

The present invention relates to an energy storage device including an electrode assembly, a case that stores the electrode assembly, a conductive member electrically connected to the electrode assembly.

BACKGROUND ART

A conventional energy storage device including an electrode assembly and a case that stores the electrode assembly is provided with an insulating member that insulates a conductive member such as an electrode terminal from the case. For example, Patent Document 1 discloses a battery in which a base is locked at a whirl-stop portion of a cover plate to limit rotation of an external terminal about an axis of a bolt. In the battery, the external terminal is disposed on the whirl-stop portion of the cover plate via a terminal insulating member.

PRIOR ART DOCUMENTS

Patent Documents

Patent Document 1: JP-A-2010-97822

SUMMARY OF THE INVENTION

Problems to be Solved by the Invention

For example, the case that stores the electrode assembly in the energy storage device such as a lithium ion secondary battery is subjected to a change of its internal pressure during a charge-discharge cycle. When the energy storage device receives a large shock to cause a short circuit, the internal pressure of the case increases. For this reason, a wall of a cover plate of the case requires a high stiffness.

Thus, the thickness of the wall of the case may be increased to improve its stiffness. However, this makes difficult to form a portion engaging with an insulating member disposed along the wall. Increasing the thickness may lead to a decrease in the volume of the case, in turn, a decrease in the capacity of the energy storage device, which is unpreferable. Alternatively, a reinforcing member may be attached to the wall of the case without increasing the thickness to improve the stiffness of the wall. However, adding the reinforcing member inhibits reduction of the energy storage device in size, decreasing the efficiency of manufacturing the energy storage device.

The present invention is devised in consideration of the conventional problems, and its object is to provide an energy storage device provided with an insulating member disposed between a conductive member and a wall of a case, the wall having a stiffness improved with a simple structure.

Means for Solving the Problems

To attain the object, an energy storage device according to one aspect of the present invention includes an electrode assembly, a case that stores the electrode assembly, and a conductive member electrically connected to the electrode assembly. The energy storage device further includes a first insulating member disposed between a wall of the case and the conductive member and a projection protrudingly provided on the wall on an opposite side to the first insulating member. The first insulating member has a first engaging portion configured to engage with a limiting portion, the limiting portion being a portion of a recess formed on the wall on an opposite side to the projection.

With this configuration, the first insulating member disposed between the conductive member and the wall of the case engages with the limiting portion that is a portion of the recess. The recess is a dented portion formed on the opposite side of the protruding projection, and the limiting portion that is a portion of the recess is used to engage with the first insulating member. This means that the recess has a dented portion other than the limiting portion for limiting the position of the first insulating member. That is, the recess (the protrusion when the wall is viewed from the opposite side to the first insulating member) functions to improve the stiffness of the wall as a whole while a portion of the recess (projection) limits the position of the first insulating member. The recess (projection) having such function can be formed only by protruding a portion of the wall and thus, can be provided in the energy storage device relatively readily.

As described above, the energy storage device according to this aspect includes the insulating member disposed between the conductive member and the wall of the case, and the stiffness of the wall is improved with a simple structure.

The energy storage device according to another aspect of the present invention may further include a second insulating member disposed on the wall on the opposite side to the first insulating member, the projection may be noncircular when viewed in a protruding direction, and the second insulating member may have a second engaging portion configured to engage with the projection.

With this configuration, the projection for improving the stiffness of the wall is used to limit the position of the second insulating member. Since the projection is noncircular in a plan view (when viewed in the protruding direction), rotation of the second insulating member that engages with the projection about the projection is also limited. As described above, with the energy storage device according to this aspect, each of the two insulating members (the first insulating member and the second insulating member) on the respective sides of the wall can be kept at the normal position or posture by utilizing the shape of the front and back sides of the projection for improving the stiffness of the wall.

In the energy storage device according to another aspect of the present invention, the projection may protrude toward an outside of the case, the conductive member may be a current collector disposed in the case, the current collector being configured to electrically connect the electrode assembly to an electrode terminal fixed to the case, the first insulating member may be at least partially disposed between the current collector and an inner face of the wall, and the second insulating member may be at least partially disposed between the electrode terminal and an outer face of the wall.

With this configuration, since the projection protrudes toward the outside of the case, the presence of the projection does not decrease the volume of the case. Therefore, the projection having the functions to improve the stiffness of the wall and limit the position of the first insulating member can be provided on the case without sacrificing the capacity of the energy storage device.

The limiting portion that is a portion of the recess limits the position of the first insulating member, which insulates the current collector from the case, on the inner face of the wall, while the projection on the opposite side to the recess limits the position and posture of the second insulating member, which insulates the electrode terminal from the case, on the outer face of the wall.

In the energy storage device according to another aspect of the present invention, the projection may be long in a transverse direction (short direction) of the wall when viewed in the protruding direction.

With this configuration, the projection can be extended substantially to both ends of the wall in the transverse direction without becoming excessively large. This suppresses deformation of the cross section of the wall in the transverse direction (outward expansion) at an increase in the internal pressure of the case. That is, the projection can reinforce the wall more effectively.

In the energy storage device according to another aspect of the present invention, the limiting portion may be a portion of the recess, and have a larger width than a width of a remaining portion of the recess in a direction crossing a depth direction.

With this configuration, the recess (projection) is formed such that the lateral width is partially extended, thereby forming the limiting portion as a portion of the recess, which engages with the first engaging portion of the first insulating member. That is, the recess for improving the stiffness of the wall and limiting the position of the first insulating member can be readily formed.

In the energy storage device according to another aspect of the present invention, the wall may have a thin portion, and the projection may be provided on a part of the thin portion.

With this configuration, the wall has the thin portion to increase the volume of the case. That is, for example, at least a part of the components disposed in the case, such as the first insulating member or the second insulating member, and the current collector, can be stored in a space increased by the thin portion. This can increase the ratio of the electrode assembly in the volume of the case, increasing the capacity of the energy storage device. The thin portion having such effect is provided with the projection to suppress a decrease in the stiffness of the entire wall.

In the energy storage device according to another aspect of the present invention, the electrode assembly may formed by winding an electrode, and the projection may be formed on the wall presenting in a winding axis direction of the electrode assembly in the case so as to protrude opposite to the electrode assembly.

With this configuration, the projection protruding opposite to the electrode assembly is disposed on the wall presenting in the winding axis direction of the electrode assembly. Thus, for example, a main body (power generating portion having a tab at its end) of the electrode assembly can be disposed at a position close to the wall, thereby increasing the capacity of the energy storage device, and moreover, the projection improves the stiffness of the wall. That is, it becomes possible to increase the capacity of the energy storage device, and to keep or improve the safety.

Advantages of the Invention

The present invention can provide an energy storage device provided with an insulating member disposed between a conductive member and a wall of a case, the wall having a stiffness improved with a simple structure.

MODE FOR CARRYING OUT THE INVENTION

An energy storage device in accordance with an embodiment of the present invention will be described below with reference to figures. The figures are schematic, and do not necessarily illustrate each component accurately.

The below-mentioned embodiment and its modification examples each provide a specific example of the present invention. Shape, material, components, arrangement and connection of the components, and order of manufacturing steps in the embodiment and its modification examples are only examples, and do not intend to limit the present invention. The components that are not recited in independent claims representing the most superordinate concept among the components in the embodiment and its modification examples are described as optional components.

First, an energy storage device 10 in the embodiment will be generally described below with reference to FIG. 1 to FIG. 3.

Figure 1:
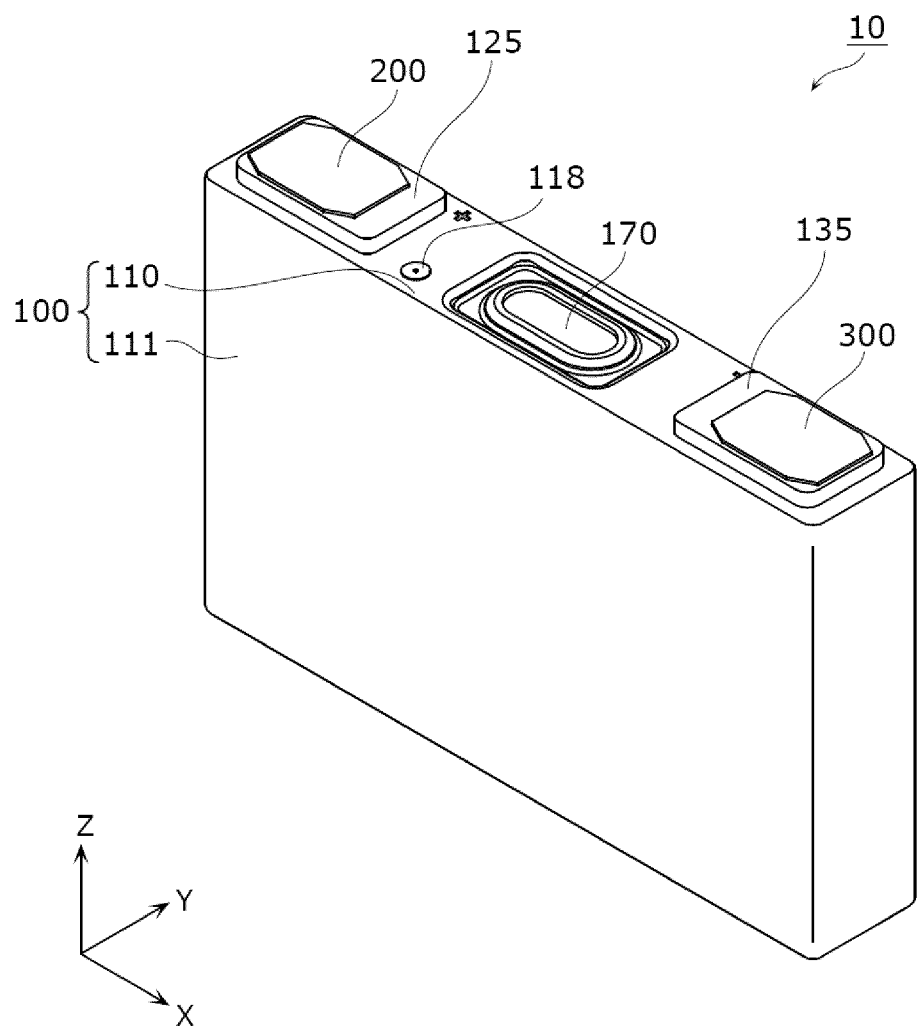
FIG. 1 is a perspective view illustrating outer appearance of an energy storage device in accordance with an embodiment.

FIG. 1 is a perspective view illustrating outer appearance of the energy storage device 10 in the embodiment. FIG. 2 is an exploded perspective view of the energy storage device 10 in the embodiment. FIG. 3 is an exploded perspective view illustrating a cover plate structure 180 in the embodiment. In FIG. 3, a positive electrode lead plate 145 and a negative electrode lead plate 155 that are bonded to a positive electrode current collector 140 and a negative electrode current collector 150, respectively, of the cover plate structure 180 are expressed as dotted lines.

In FIG. 1 and subsequent figures, for convenience of description, a vertical direction is defined as a Z-axis direction. However, in actuality, the vertical direction may be inconsistent with the Z-axis direction.

The energy storage device 10 is a secondary battery capable of charging and discharging electricity, more specifically, is a nonaqueous electrolyte secondary battery such as a lithium ion secondary battery. The energy storage device 10 is applied to, for example, electric cars (EVs), hybrid electric cars (HEVs), or plug-in hybrid electric cars (PHEVs). The energy storage device 10 is not limited to the nonaqueous electrolyte secondary battery, and may be a secondary battery other than the nonaqueous electrolyte secondary battery, or may be a capacitor.

Figure 2:
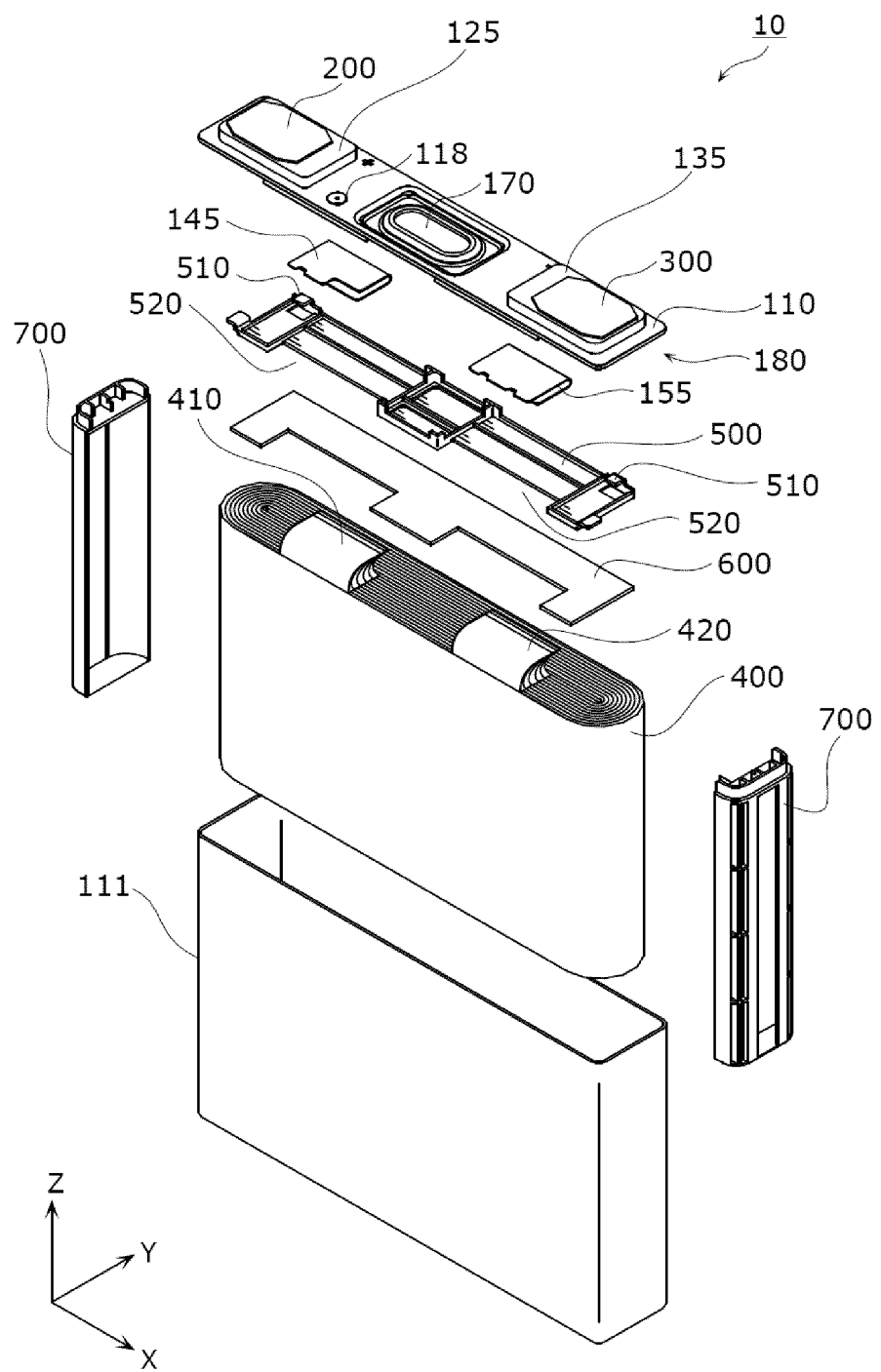
FIG. 2 is an exploded perspective view illustrating the energy storage device in the embodiment.

As illustrated in FIG. 1 and FIG. 2, the energy storage device 10 includes an electrode assembly 400, a case 100 that stores the electrode assembly 400, and conductive members electrically connected to the electrode assembly 400. In this embodiment, the energy storage device 10 includes the positive electrode current collector 140 and the negative electrode current collector 150 as the conductive members, and the cover plate structure 180 including the positive electrode current collector 140 and the negative electrode current collector 150 are disposed above the electrode assembly 400.

The cover plate structure 180 has a cover plate 110 of the case 100, a positive electrode terminal 200, a negative electrode terminal 300, upper insulating members 125 and 135, lower insulating members 120 and 130, the positive electrode current collector 140, and the negative electrode current collector 150.

The positive electrode terminal 200 is electrically connected to the positive electrode of the electrode assembly 400 via the positive electrode current collector 140, and the negative electrode terminal 300 is electrically connected to the negative electrode of the electrode assembly 400 via the negative electrode current collector 150. The conductive members electrically connected to the electrode assembly 400, such as the positive electrode current collector 140, are insulated from the case 100 by using the insulating members such as the lower insulating member 120.

The upper insulating members 125 and 135, and the lower insulating members 120 and 130 each are an insulating member disposed between the wall of the case 100 and the conductive members. In this embodiment, each of the insulating member is disposed along the cover plate 110 that forms an upper wall among six walls constituting the outer shape of the substantially rectangular parallelepiped-shaped case 100.

The energy storage device 10 in accordance with this embodiment further includes an upper spacer 500 and a cushioning sheet 600, which are disposed between the cover plate structure 180 and the electrode assembly 400.

The upper spacer 500 has locking portions 510 that is disposed between one side of the electrode assembly 400, on which tabs 410 and 420 are provided, and the cover plate 110, and lock at a portion of the cover plate structure 180. In other words, the upper spacer 500 has the locking portions 510 that hang on a portion of the cover plate structure 180.

Specifically, the upper spacer 500 is flat plate-shaped as a whole, and has the two locking portions 510 and two openings 520 into which the tabs 410 and 420 are inserted (through which the tabs 410 and 420 pass). In this embodiment, the openings 520 are notches in the upper spacer 500. The upper spacer 500 is made of an insulating material, for example, polycarbonate (PC), polypropylene (PP), polyethylene (PE), or polyphenylene sulfide resin (PPS).

The upper spacer 500 functions to directly or indirectly limit upward movement of the electrode assembly 400 (toward the cover plate 110), or to prevent short circuit between the cover plate structure 180 and the electrode assembly 400. The upper spacer 500 has the two locking portions 510, and the two locking portions 510 each locks at an attachment portion 122 or 132 of the cover plate structure 180. The cushioning sheet 600 is made of a highly-flexible porous material such as foamed polyethylene, and functions to absorb shock between the electrode assembly 400 and the upper spacer 500.

In this embodiment, side spacers 700 are disposed between side faces of the electrode assembly 400, which are located in the direction crossing the aligning direction (Z-axis direction) of the electrode assembly 400 and the cover plate 110, (that is, both side faces located in the X-axis direction in this embodiment) and the inner face of the case 100. The side spacers 700 function to limit the position of, for example, the electrode assembly 400. Like the upper spacer 500, the side spacers 700 are made of an insulating material such as PC, PP, PE, or PPS.

Figure 3:
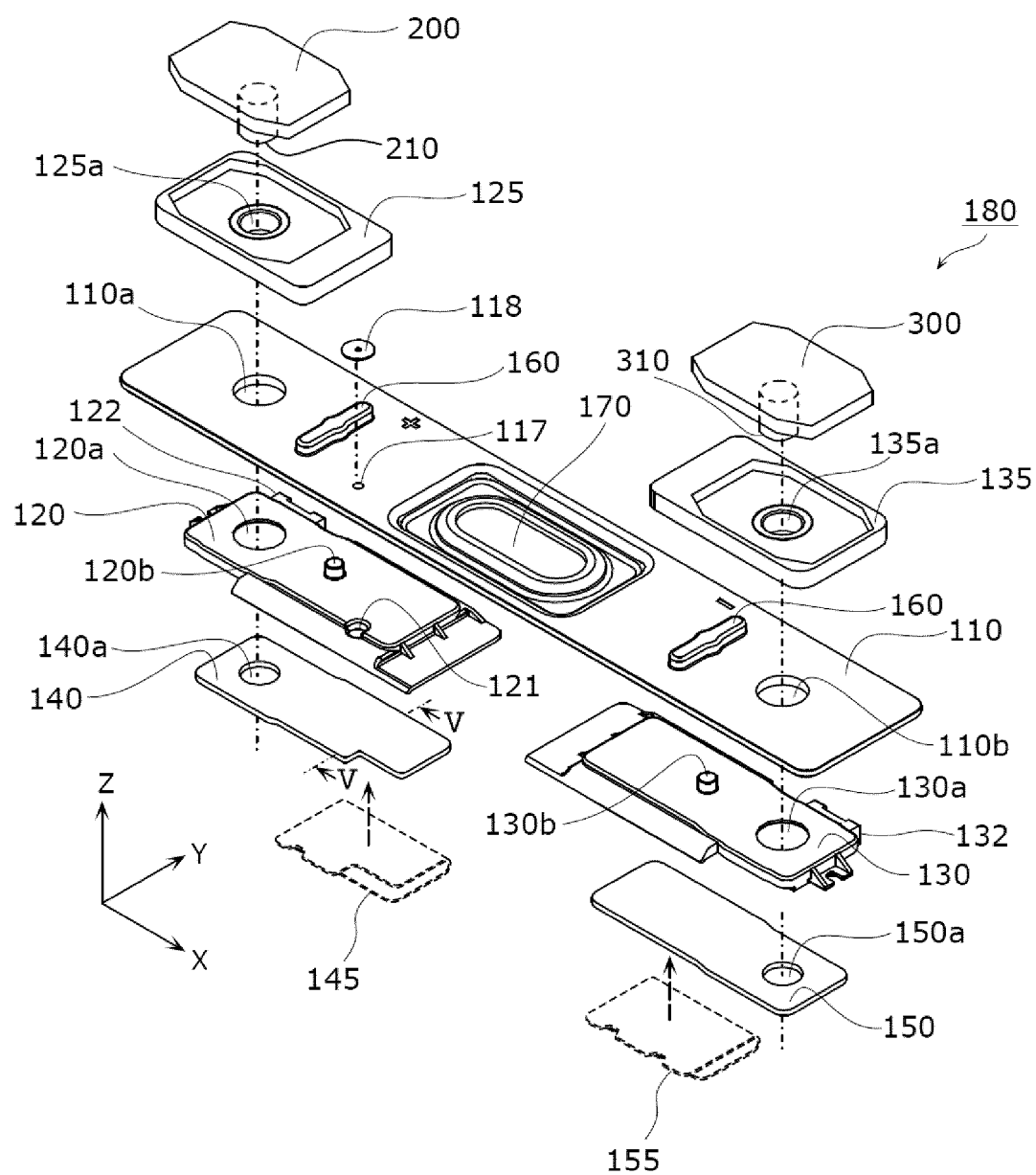
FIG. 3 is an exploded perspective view illustrating a cover plate structure in the embodiment.

The energy storage device 10 may include, in addition to the components illustrated in FIG. 1 to FIG. 3, an insulating film that encloses the electrode assembly 400, a cushioning sheet disposed between the electrode assembly 400 and the bottom face of the case 100 (main body 111), and any other suitable component. An electrolyte solution (nonaqueous electrolyte) is filled in the case 100 of the energy storage device 10 and however, its illustration is omitted.

The case 100 is constituted of the rectangular tube-like main body 111 with a bottom, and the cover plate 110 that closes an opening of the main body 111. The case 100 is rectangular parallelepiped-shaped as a whole, and is constituted of the six walls as described above. Specifically, the case 100 has the upper wall formed of the cover plate 110, the lower wall opposed to the upper wall, and four side walls that connect the upper wall to the lower wall. That is, the main body 111 forms the lower wall and the four side walls.

The electrode assembly 400 and so on are stored in the case 100 and then, the cover plate 110 and the main body 111 are bonded to the case 100 to seal the case 100. The material for the cover plate 110 and the main body 111 is not specifically limited, but is preferably, weldable metal such as stainless steel, aluminum, or aluminum alloy.

As illustrated in FIG. 2 and FIG. 3, the cover plate 110 has a safety valve 170, an electrolyte solution filling port 117, through holes 110a and 110b, and two expanding portions 160 as projections. The safety valve 170 is opened when the internal pressure of the case 100 rises to emit gas in the case 100.

The electrolyte solution filling port 117 is a through hole for filling electrolyte solution during manufacturing of the energy storage device 10. As illustrated in FIG. 1 to FIG. 3, the cover plate 110 is provided with an electrolyte solution filling plug 118 that closes the electrolyte solution filling port 117. That is, during manufacturing of the energy storage device 10, the electrolyte solution is filled into the case 100 through the electrolyte solution filling port 117, and the electrolyte solution filling plug 118 is welded to the cover plate 110 to close the electrolyte solution filling port 117, thereby storing the electrolyte solution in the case 100.

The type of the electrolyte solution filled in the case 100 is not specifically limited as long as it does not impair performances of the energy storage device 10, and may be selected from various types.

Each of the two expanding portions 160 is a portion (projection) that is provided on the wall of the case 100 (the cover plate 110 in this embodiment) and expands (protrudes) to the opposite side to the lower insulating member 120 or 130. That is, in this embodiment, the two expanding portions 160 each expand toward the outside of the case 100. The expanding portions 160 function to improve the stiffness of the cover plate 110 that is the wall on which the expanding portions 160 are provided, and to limit the position of at least one of the insulating members. In this embodiment, the expanding portions 160 are used to determine (limit) the position of the upper insulating member 125 (135). The back faces of the expanding portions 160 (the faces opposed to the electrode assembly 400) each have upwardly concave recess, and a portion of the recess engages with the engaging portion 120b (130b) of the lower insulating member 120 (130). Thereby, the lower insulating member 120 (130) is also located, and is fixed to the cover plate 110 in this state. Details of the configuration of the expanding portions 160 in the energy storage device 10 will be described later with reference to FIG. 6 to FIG. 9.

The upper insulating member 125 electrically insulates the positive electrode terminal 200 from the cover plate 110, and the lower insulating member 120 electrically insulates the positive electrode current collector 140 from the cover plate 110. The upper insulating member 135 electrically insulates the negative electrode terminal 300 from the cover plate 110, and the lower insulating member 130 electrically insulates the negative electrode current collector 150 from the cover plate 110. The upper insulating members 125 and 135 each may be also referred to as upper packing, and the lower insulating members 120 and 130 each may be also referred to as lower packing. That is, in this embodiment, the upper insulating members 125 and 135, and the lower insulating members 120 and 130 also function to seal a section between the electrode terminal (200 or 300) and the case 100.

Like the upper spacer 500, the upper insulating member 125 and 135, and the lower insulating members 120 and 130 are made of an insulating material such as PC, PP, PE, or PPS. A through hole 121 that guides the electrolyte solution flowing through the electrolyte solution filling port 117 to the electrode assembly 400 is provided in the lower insulating member 120 immediately below the electrolyte solution filling port 117.

The positive electrode terminal 200 is electrically connected to the positive electrode of the electrode assembly 400 via the positive electrode current collector 140, and the negative electrode terminal 300 is electrically connected to the negative electrode of the electrode assembly 400 via the negative electrode current collector 150. That is, the positive electrode terminal 200 and the negative electrode terminal 300 are metal electrode terminals for leading electricity stored in the electrode assembly 400 to space outside the energy storage device 10, and introducing electricity into space within the energy storage device 10 to store electricity in the electrode assembly 400. The positive electrode terminal 200 and the negative electrode terminal 300 are made of aluminum or aluminum alloy.

The positive electrode terminal 200 is provided with a fastening portion 210 that fastens the positive electrode current collector 140 to the case 100, and the negative electrode terminal 300 is provided with a fastening portion 310 that fastens the negative electrode current collector 150 to the case 100.

The fastening portion 210 is a member (rivet) extending downward from the positive electrode terminal 200, and is inserted into a through hole 140a of the positive electrode current collector 140 and caulked. Specifically, the fastening portion 210 is inserted into a through hole 125a of the upper insulating member 125, a through hole 110a of the cover plate 110, a through hole 120a of the lower insulating member 120, and the through hole 140a of the positive electrode current collector 140, and caulked. Thereby, the positive electrode terminal 200 is electrically connected to the positive electrode current collector 140, and the positive electrode current collector 140 along with the positive electrode terminal 200, the upper insulating member 125, and the lower insulating member 120 is fixed to the cover plate 110.

The fastening portion 310 is a member (rivet) extending downward from the negative electrode terminal 300, and is inserted into a through hole 150a of the negative electrode current collector 150, and is caulked. Specifically, the fastening portion 310 is inserted into a through hole 135a of the upper insulating member 135, a through hole 110b of the cover plate 110, a through hole 130a of the lower insulating member 130, and the through hole 150a of the negative electrode current collector 150, is caulked. Thereby, the negative electrode terminal 300 is electrically connected to the negative electrode current collector 150, and the negative electrode current collector 150 along with the negative electrode terminal 300, the upper insulating member 135, and the lower insulating member 130 is fixed to the cover plate 110.

The fastening portion 210 may be integral with the positive electrode terminal 200, or the fastening portion 210 as an independent component may be fixed to the positive electrode terminal 200 by caulking, welding, or any other suitable means. The same applies to the fastening portion 310 and the negative electrode terminal 300.

The positive electrode current collector 140 is disposed between the electrode assembly 400 and the case 100, and electrically connects the electrode assembly 400 to the positive electrode terminal 200. The positive electrode current collector 140 is made of aluminum or aluminum alloy. In this embodiment, the positive electrode current collector 140 is electrically connected to the tab 410 on the positive electrode side of the electrode assembly 400 via the positive electrode lead plate 145.

The negative electrode current collector 150 is disposed between the electrode assembly 400 and the case 100, and electrically connects the electrode assembly 400 to the negative electrode terminal 300. The negative electrode current collector 150 is made of copper or copper alloy. In this embodiment, the negative electrode current collector 150 is electrically connected to the tab 420 on the negative electrode side of the electrode assembly 400 via the negative electrode lead plate 155.

Details of a connection between the current collector and the tab via a lead plate will be described later with reference to FIG. 5.

Figure 4:
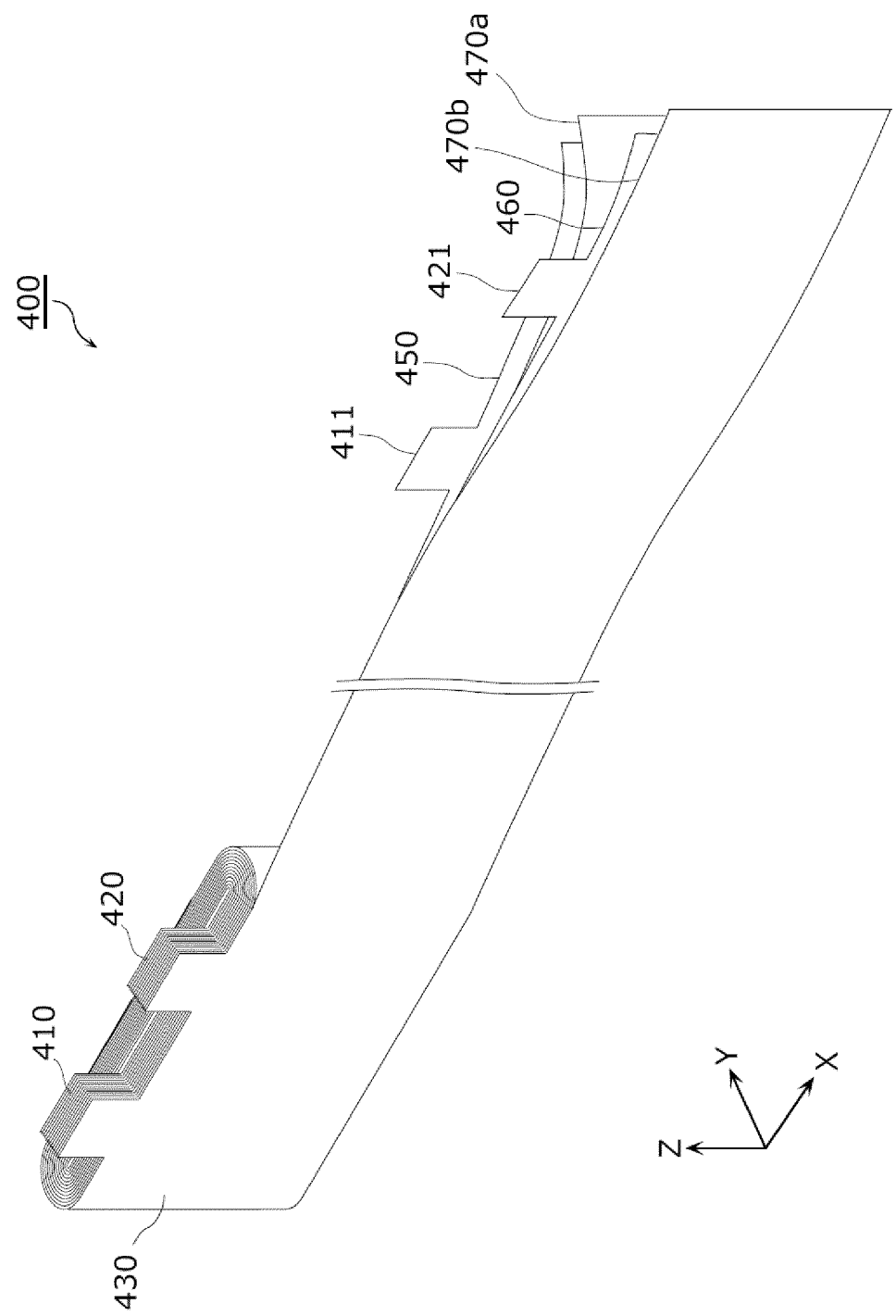
FIG. 4 is a perspective view illustrating the configuration of an electrode assembly in the embodiment.

Next, the configuration of the electrode assembly 400 will be described below with reference to FIG. 4. FIG. 4 is a perspective view illustrating the configuration of the electrode assembly 400 in the embodiment. FIG. 4 is a partial exploded view illustrating the winding state of the electrode assembly 400.

The electrode assembly 400 is a power generating element capable of storing electricity, and as illustrated in FIG. 4, is formed by alternately stacking and winding a positive electrode 450, a separator 470a, a negative electrode 460, and a separator 470b. That is, the electrode assembly 400 is formed by stacking the positive electrode 450, the separator 470a, the negative electrode 460, and the separator 470b in this order to have an elliptical cross section. The electrode assembly 400 is formed such that the separators 470a and 470b protrude in a winding axis direction (a positive side and a negative side of the Z-axis direction). This can suppress short circuit between the electrode assembly 400 and another conductive member in the winding axis direction.

The positive electrode 450 is an electroplate in which a positive electrode active material layer is formed on the surface of a positive electrode substrate layer that is a long band-like metal foil made of aluminum or aluminum alloy. The positive electrode active material for the positive electrode active material layer may be any well-known positive electrode active material capable of occluding and ejecting lithium ions. Examples of the positive electrode active material include spinel compound including polyanion compound, lithium titanate, and lithium manganate such as $LiMPO_4$, $LiMSiO_4$, $LiMBO_3$ (M is one or two or more types of transition metal elements selected from Fe, Ni, Mn, Co, and so on), and lithium transition metal oxide such as $LiMO_2$ (M is one or two or more types of transition metal elements selected from Fe, Ni, Mn, Co, and so on).

The negative electrode 460 is an electroplate in which a negative electrode active material layer is formed on the surface of a negative electrode substrate layer that is a long band-like metal foil made of copper or copper alloy. The negative electrode active material for the negative electrode active material layer may be any well-known negative electrode active material capable of occluding and ejecting lithium ions. Examples of the negative electrode active material include lithium metal, lithium alloy (lithium-containing alloy such as lithium-aluminum, lithium-lead, lithium-tin, lithium-aluminum-tin, lithium-gallium, and Wood's alloy), alloy capable of occluding and ejecting lithium, carbon material (for example, graphite, hardly graphitized carbon, easy graphited carbon, low-temperature baked carbon, amorphous carbon), metal oxide, lithium metal oxide (ex. $Li_4Ti_5O_{12}$), and polyphosphoric acid compound.

The separators 470a and 470b each are a microporous sheet made of resin. The material for the separators 470a and 470b used in the energy storage device 10 may be any suitable well-known material unless the material impairs performances of the energy storage device 10.

The positive electrode 450 has a plurality of protruding portions 411 that protrude outward at one end of the winding axis direction. Similarly, the negative electrode 460 has a plurality of protruding portions 421 that protrude outward at the one end of the winding axis direction. The protruding portions 411 and the protruding portions 421 are portions that are not coated with the active material and leave the substrate layer exposed (active material-uncoated portion).

The winding axis is a virtual axis used as a central axis around which the positive electrode 450 and the negative electrode 460 is wound, and in this embodiment, the winding axis is a straight line parallel to the Z-axis direction that passes the center of the electrode assembly 400.

The protruding portions 411 and the protruding portions 421 are disposed at the end on the same side of the winding axis direction (the end on the positive side of the Z-axis direction in FIG. 4). The positive electrode 450 and the negative electrode 460 are stacked and thus, the protruding portions 411 and the protruding portions 421 are stacked at predetermined positions in the electrode assembly 400. Specifically, the positive electrode 450 is stacked by being wound, such that the plurality of protruding portions 411 are stacked at a predetermined circumferential position at one end of the winding axis direction. The negative electrode 460 is stacked by being wound, such that the plurality of protruding portions 421 are stacked at a predetermined circumferential position other than the position where the protruding portions 411 are stacked, at the one end of the winding axis direction.

As a result, the electrode assembly 400 is provided with the tab 410 formed by stacking the plurality of protruding portions 411 and the tab 420 formed by stacking the plurality of protruding portions 421. The tab 410 is collected, for example, toward the center of the stacking direction, and is bonded to the positive electrode lead plate 145, for example, by ultrasonic welding. The tab 420 is collected, for example, toward the center of the stacking direction, and is bonded to negative electrode lead plate 155, for example, by ultrasonic welding. The positive electrode lead plate 145 bonded to the tab 410 is bonded to the positive electrode current collector 140, and the negative electrode lead plate 155 bonded to the tab 420 is bonded to the negative electrode current collector 150.

The tabs (410, 420) leads and introduces electricity in the electrode assembly 400, and may also be referred to as "lead (portion)" and "current collecting portion".

The tab 410 is formed by stacking the protruding portions 411 that leave the substrate layer exposed and thus, does not contribute to power generation. Similarly, the tab 420 is formed by stacking the protruding portions 421 that leave the substrate layer exposed and thus, does not contribute to power generation. On the contrary, the portion of the electrode assembly 400 except for the tabs 410 and 420 is formed by stacking the portions coated with the active material on the substrate layer and thus, contributes to power generation. The portion will be hereinafter referred to as a power generating portion 430.

Next, an example of the configuration of the connection between the current collector and the tab via the lead plate will be described below with reference to FIG. 5.

Figure 5:
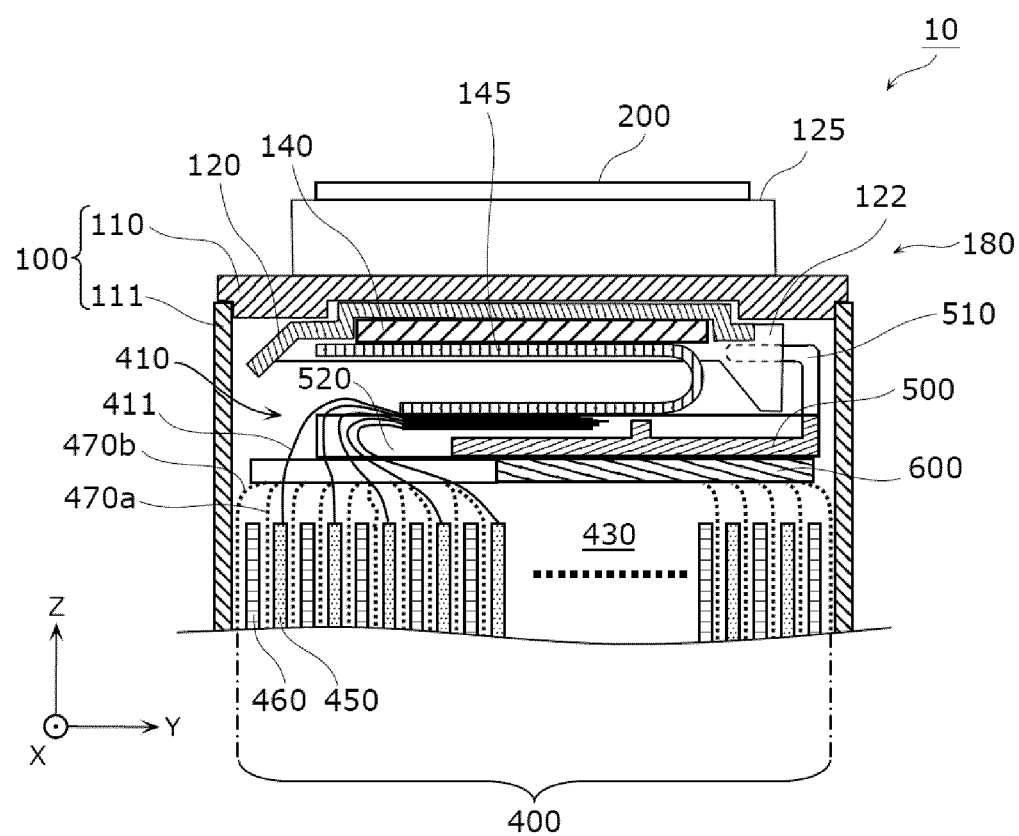
FIG. 5 is a schematic sectional view illustrating a positive electrode lead plate and surrounding structure in the embodiment.

FIG. 5 is a schematic sectional view illustrating the positive electrode lead plate 145 and its surrounding structure in the embodiment. FIG. 5 illustrates a partial cross section of the energy storage device 10 taken along a YZ plane passing a line V-V in FIG. 3, and does not illustrate the side spacers 700 on the negative side of the X-axis direction (See FIG. 2). The electrode assembly 400 is simplified for illustration.

As illustrated in FIG. 5, the tab 410 of the electrode assembly 400 is electrically connected to the positive electrode current collector 140 via the positive electrode lead plate 145 having a U-shaped cross section. The connection structure is produced, for example, according to a following procedure.

An end (first end) of the flat plate-like positive electrode lead plate 145 is bonded to the tab 410 of the electrode assembly 400 by, for example, ultrasonic welding. Further, an end (second end) opposite to the first end of the positive electrode lead plate 145 is bonded to the positive electrode current collector 140 integrated into the cover plate structure 180 by, for example, laser welding. Then, the positive electrode lead plate 145 is bent into a U-shape at a predetermined position between the first end and the second end. As illustrated in FIG. 5, this results in the connection structure between the tab 410 of the electrode assembly 400 and the positive electrode current collector 140 via the positive electrode lead plate 145 having the U-shaped cross section.

The upper spacer 500 is disposed between the side of the electrode assembly 400, on which the tab 410 is provided, and the cover plate 110. Describing in more detail, the upper spacer 500 separates the bonded portion of the tab 410 and the positive electrode lead plate 145 from the power generating portion 430 of the electrode assembly 400. The tab 410 is inserted into the opening 520 in the upper spacer 500. As illustrated in FIG. 5, the cushioning sheet 600 is sandwiched between the upper spacer 500 and the power generating portion 430 of the electrode assembly 400.

FIG. 5 illustrates the configuration around the positive electrode lead plate 145, and the configuration is the same as the configuration around the negative electrode lead plate 155. That is, the tab 420 of the electrode assembly 400 is electrically connected to the negative electrode current collector 150 via the negative electrode lead plate 155 having a U-shaped cross section (See FIG. 2, for example). The upper spacer 500 separates the bonded portion of the tab 420 and the negative electrode lead plate 155, and the power generating portion 430 of the electrode assembly 400, and the tab 420 is inserted into the opening 520 in the upper spacer 500.

The electrode assembly 400 is connected to the positive electrode current collector 140 and the negative electrode current collector 150 via the positive electrode lead plate 145 and the negative electrode lead plate 155, respectively, in this manner, enabling reduction of the length (the length in the winding axis direction (Z-axis direction)) of the tabs 410 and 420 of the electrode assembly 400.

That is, the width (the length in the winding axis direction (Z-axis direction)) of the electroplates of the positive electrode 450 and the negative electrode 460, which is required to manufacture the electrode assembly 400, can be reduced. This is advantageous in terms of the manufacturing efficiency of the electrode assembly 400.

The upper spacer 500 is disposed between the power generating portion 430 of the electrode assembly 400 and the cover plate 110, making the power generating portion 430 closer to the cover plate 110 via the upper spacer 500. This can increase the ratio of the electrode assembly 400 in the volume of the case 100.

In the energy storage device 10 in accordance with this embodiment, the insulating member made of resin is disposed between the conductive members such as the positive electrode current collector 140 and the cover plate 110 of the case 100, and the expanding portions 160 of the cover plate 110 limits the position of the insulating members. The expanding portions 160 also function to improve the stiffness of the cover plate 110. These features will be described below with reference to FIG. 6 to FIG. 9.

Figure 6:
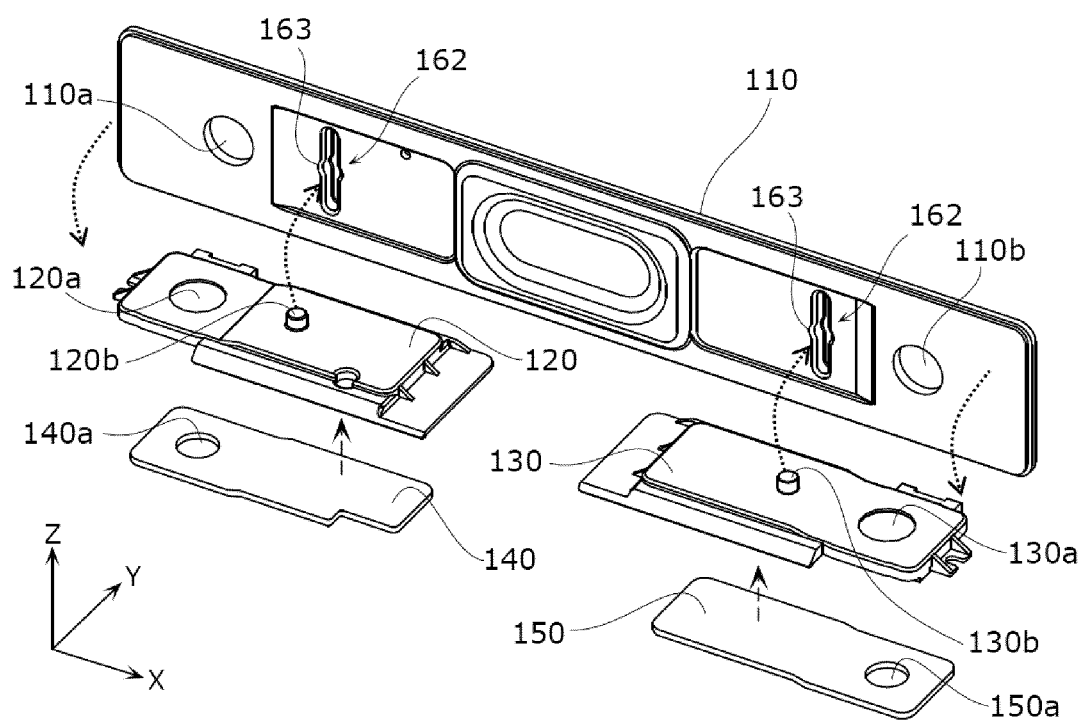
FIG. 6 is an exploded perspective view illustrating the configurational relation between the cover plate and lower insulating members in the embodiment.
Figure 7:
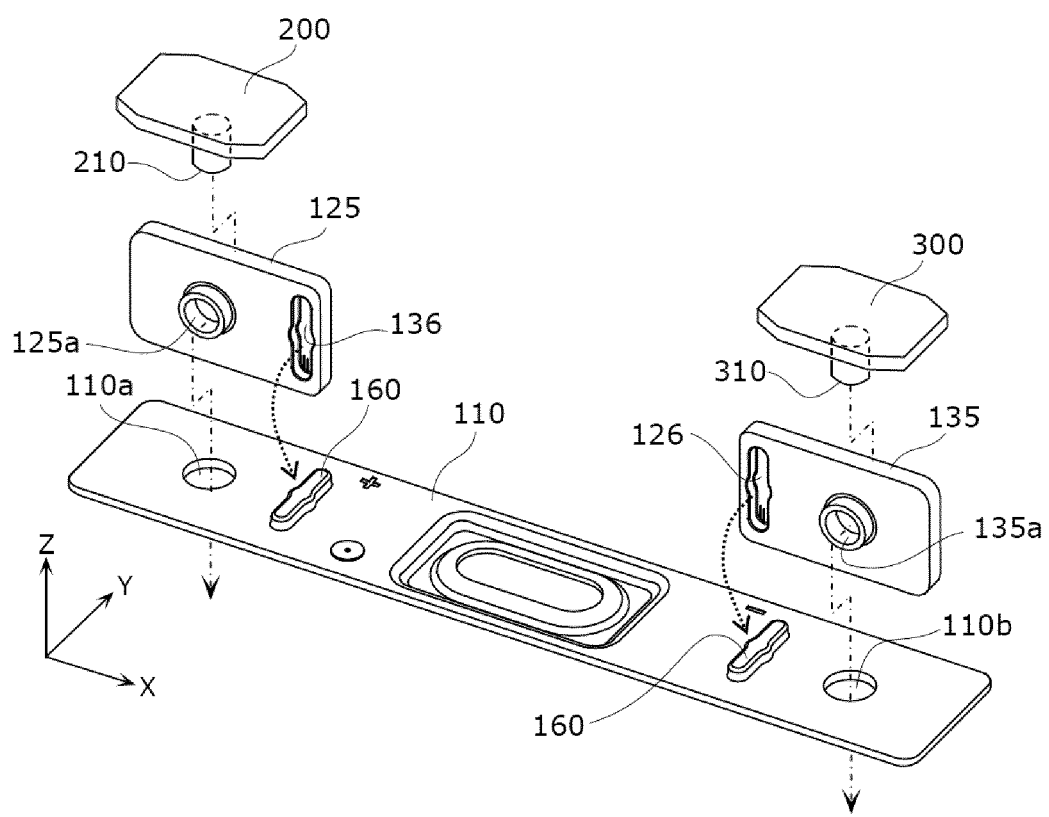
FIG. 7 is an exploded perspective view illustrating the configurational relation between the cover plate and upper insulating members in the embodiment.

FIG. 6 is an exploded perspective view illustrating the configurational relation between the cover plate 110 and the lower insulating members 120 and 130 in the embodiment. FIG. 7 is an exploded perspective view illustrating the configurational relation between the cover plate 110 and the upper insulating members 125 and 135 in the embodiment.

In FIG. 6, to illustrate recesses 162 formed on the back side of the respective expanding portions 160 in the cover plate 110, the cover plate 110 is separated from the lower insulating members 120 and 130, and is rotated about the X axis by 90 degrees. In FIG. 7, to illustrate the engaging portion 126 of the upper insulating member 135 and the engaging portion 136 of the upper insulating members 125, the upper insulating members 125 and 135 are separated from the cover plate 110 and rotated about the X axis by 90 degrees.

As illustrated in FIG. 6, at least a portion of the lower insulating member 120 is disposed between the positive electrode current collector 140 and the cover plate 110, and at least a portion of the lower insulating member 130 is disposed between the negative electrode current collector 150 as an example of a conductive member and the cover plate 110. In this embodiment, each of the lower insulating members 120 and 130 is an example of a first insulating member, are each of the positive electrode current collector 140 and the negative electrode current collector 150 is an example of a conductor insulated using the first insulating member.

The lower insulating members 120 and 130 have respective engaging portions that engage with respective limiting portions 163, which each are a portion of the recess 162 formed on the back side of the expanding portion 160 in the cover plate 110. Specifically, the lower insulating member 120 has the engaging portion 120b protruding toward the cover plate 110, and the lower insulating member 130 has the engaging portion 130b protruding toward the cover plate 110.

The expanding portions 160 each are expanded from a portion of the cover plate 110 as a metal plate by press working or any other suitable means, and may be referred to as "bead". That is, the cover plate 110 has one or more expanding portions 160 to increase the stiffness of the cover plate 110.

The recess 162 is formed on the back side of the expanding portion 160 by expanding the expanding portion 160 to one side of the thickness direction of the cover plate 110, and the limiting portion 163 that is a portion of the recess 162 engages with the lower insulating member 120 (130).

That is, the recess 162 has a concave portion other than the limiting portion 163 that limits the position of the lower insulating member 120 (130). This means that recess 162 (the expanding portions 160 when viewed from the opposite side) functions to improve the stiffness of the entire cover plate 110 while limiting the position of the lower insulating member 120 (130). In other words, recess 162 has further a concave portion that is not used for engagement with the lower insulating member 120 (130) in addition to the portion used for the engagement. Thereby, the recess 162 (expanding portion 160) can increase the stiffness of the cover plate 110. Further, since the lower insulating member 120 (130) only needs to have the engaging portion 120b (130b) that engages with only the limiting portion as a portion of the recess, the lower insulating member 120 (130) can be reduced in weight.

The recesses 162 (expanding portions 160) having such function can be formed by press working of a portion of the cover plate 110 as described above and therefore, can be provided in the energy storage device 10 relatively readily.

As described above, the energy storage device 10 in this embodiment includes the insulating member disposed between the conductive members and the cover plate 110 that is the wall of the case 100, and the stiffness of the cover plate 110 is improved with simple structure.

As illustrated in FIG. 7, in this embodiment, the upper insulating members 125 and 135 are disposed on the face of the cover plate 110, which is opposite to the face on which the lower insulating members 120 and 130 are disposed. In this embodiment, each of the upper insulating members 125 and 135 is an example of a second insulating member.

The two expanding portions 160 expand from the cover plate 110 toward the opposite side to the lower insulating members 120 and 130 (positive side of the Z-axis direction in FIG. 6). That is, the two expanding portions 160 expand from the face of the cover plate 110, on which the upper insulating members 125 and 135 are disposed.

With such configuration, the two expanding portions 160 each are noncircular in a plan view (when viewed in the expanding direction (protruding direction)). The upper insulating member 125 has the engaging portion 126 that engages with the expanding portion 160, and the upper insulating member 135 has the engaging portion 136 that engages with the expanding portion 160.

As described above, the expanding portion 160 that increases the stiffness of the cover plate 110 as one wall of the case 100 is also used to limit the position of the upper insulating member 125 (135). The expanding portions 160 are noncircular in a plan view (when viewed in the expanding direction (protruding direction)) and thus, can prevent the upper insulating member 125 (135) that engages with the expanding portion 160 from rotating about the expanding portion 160. Therefore, for example, during manufacturing of the energy storage device 10, the expanding portion 160 can be used to determine and keep the position and posture of the upper insulating member 125 (135). The engagement between the expanding portion 160 and the upper insulating member 125 (135) is kept thereafter, improving the stability of the position and posture of the upper insulating member 125 (135) during use.

Describing in more detail, in this embodiment, the expanding portions 160 expand toward the outside of the case 100 (the positive side of the Z-axis direction in FIG. 7). At least a portion of the upper insulating member 125 is disposed between the positive electrode terminal 200 and the face of the cover plate 110, on which the expanding portions 160 are formed (the outer face), and at least a portion of the upper insulating member 135 is disposed between the negative electrode terminal 300 and the outer face of the cover plate 110. At least a portion of the lower insulating member 120 is disposed between the positive electrode current collector 140 and the inner face of the cover plate 110, and at least a portion of the lower insulating member 130 is disposed between the negative electrode current collector 150 and the inner face of the cover plate 110.

Since the expanding portions 160 expand toward the outside of the case 100, the presence of the expanding portions 160 do not decrease the volume of the case 100. That is, the expanding portions 160 that serve to improve the stiffness of the cover plate 110 and limit the position of the lower insulating member 120 (130) can be provided on the case 100 without sacrificing the capacity of the energy storage device 10.

Specifically, the energy storage device 10 in this embodiment can keep the proper position and posture of the lower insulating member 120 (130) on the inner face of the case 100 and the upper insulating member 125 (135) on the outer face of the case 100 by using the shape of the expanding portions 160 on the front and back sides for improving the stiffness of the cover plate 110.

The electrode assembly 400 in this embodiment is formed by winding the positive electrode 450 and the negative electrode 460 (See FIG. 4). The expanding portions 160 expand from the cover plate 110 of the case 100 toward the opposite side to the electrode assembly 400 in the winding axis direction of the electrode assembly 400.

Thus, the power generating portion 430 of the electrode assembly 400 can be disposed relatively close to the cover plate 110, thereby increasing the capacity of the energy storage device 10. In addition, the expanding portions 160 improve the stiffness of the cover plate 110. That is, the capacity of the energy storage device 10 can be increased and moreover, the safety can be maintained or improved.

In this embodiment, the upper spacer 500 and the cushioning sheet 600 are disposed above the power generating portion 430. For this reason, if a foreign matter such as a minute metal piece is present in the case 100, the upper spacer 500 or the cushioning sheet 600 prevents the foreign matter from entering into the power generating portion 430 through gaps between edges of the separators 470a and 470b aligned in the stacking direction.

In this embodiment, as illustrated in FIG. 7, for example, the expanding portions 160 extend long in the transverse direction of the cover plate 110 (Y-axis direction) when viewed in the expanding direction (protruding direction).

In this embodiment, the cover plate 110 is shaped as an oblong rectangle extending in the X-axis direction as a whole, and its center in the transverse direction expands upward when the internal pressure of the case 100 increases. Unless this deformation is suppressed, the cover plate 110 may be broken at an unpredicted position. However, in the energy storage device 10 in this embodiment, the expanding portions 160 extend long in the transverse direction of the cover plate 110 without being excessively large to be close to both transverse ends of the cover plate 110. This suppresses deformation (outward expansion) of the cross section (YZ cross section) of the cover plate 110 in the transverse direction at an increase in the internal pressure of the case 100. That is, the expanding portions 160 can reinforce the cover plate 110 more effectively.

Figure 8:
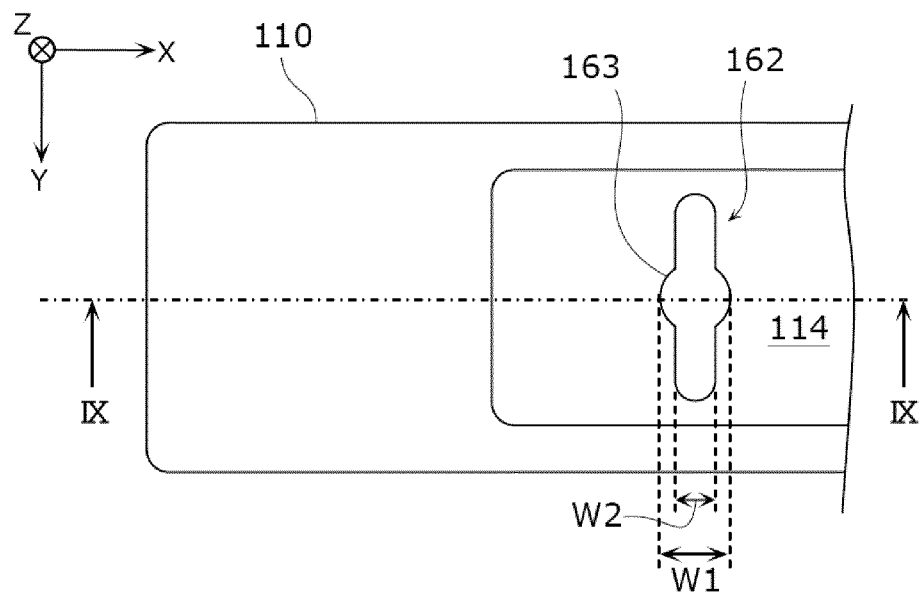
FIG. 8 is a plan view illustrating an example of the shape of a recess in the embodiment.
Figure 9:
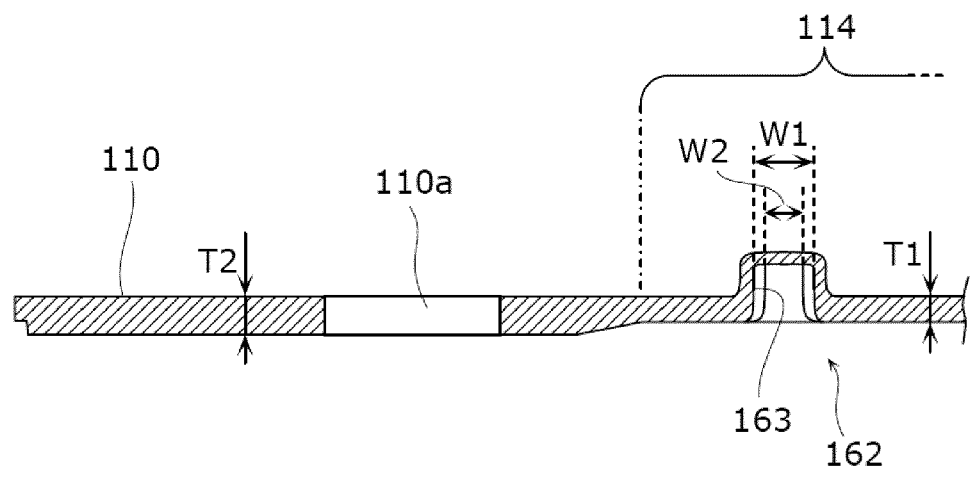
FIG. 9 is a schematic sectional view illustrating the cover plate in the embodiment taken along IX-IX in FIG. 8.

The recesses 162 of energy storage device 10 in this embodiment also have several features. These features will be described below with reference to FIG. 8 and FIG. 9. FIG. 8 is a plan view illustrating an example of the shape of the recess 162 in this embodiment. FIG. 8 is a view illustrating the cover plate 110 when viewed from below (the negative side of the Z-axis direction). FIG. 9 is a schematic view illustrating the cross section of the cover plate 110 in this embodiment taken along IX-IX in FIG. 8.

As illustrated in FIG. 8 and FIG. 9, the limiting portion 163 is a portion of the recess 162, in which a width W1 in a direction crossing the depth direction (Z-axis direction in this embodiment) (the X-axis direction in this embodiment) is larger than a width W2 of the other portion. In this embodiment, the limiting portion 163 is provided in a portion of the recess 162 such that its inner diameter forms the round hole having W1.

That is, in this embodiment, the recess 162 formed as the long groove in the cover plate 110 in the transverse direction (Y-axis direction) has a portion with enlarged longitudinal width, and the portion functions as the limiting portion 163.

In other words, the width of the engaging portion 120b of the lower insulating member 120 in the X-axis direction, which engages with the limiting portion 163 illustrated in FIG. 8 and FIG. 9, is W1 or less and larger than W2. Thus, when the engaging portion 120b is inserted into the limiting portion 163 and engages with the limiting portion 163, the position of the lower insulating member 120 on the XY plane is limited by the limiting portion 163.

In this embodiment, the shape of the limiting portion 163 on the negative electrode side is laterally reversed from the shape of the limiting portion 163 illustrated in FIG. 8 and FIG. 9, and is the substantially same as the shape of the limiting portion 163 illustrated in FIG. 8 and FIG. 9. That is, since the engaging portion 130b is inserted into the limiting portion 163, and the engaging portion 130b engages with the limiting portion 163, the position of the lower insulating member 130 in the XY plane is limited by the limiting portion 163.

In this embodiment, the lateral width of the recess 162 (expanding portion 160) is partially extended to form the limiting portion 163 as a portion of the recess 162. For example, the recess 162 having the limiting portion 163 can be formed in the cover plate 110 by one press working of forming the recess 162 (expanding portion 160). Therefore, the recesses 162 capable of improving the stiffness of the cover plate 110 and limiting the position of the lower insulating member 120 (130) can be readily formed.

In this embodiment, as illustrated in FIG. 9, the cover plate 110 has a thin portion 114 and as illustrated in FIG. 8 and FIG. 9, the expanding portion 160 (recess 162) is provided on a portion of the thin portion 114. The thin portion 114 of the cover plate 110 has a smaller thickness T1 than a thickness T2 of a remaining portion of the cover plate, and is provided in a portion of the cover plate 110 by press working of molding the cover plate 110.

The thin portion 114 of the cover plate 110 increases the volume of the case 100. For example, at least a portion of each of the components disposed in the case 100, such as the lower insulating member 120 and the positive electrode current collector 140, can be stored in the space increased due to the thin portion 114. This can increase the ratio of the electrode assembly 400 in the volume of the case 100, increasing the capacity of the energy storage device 10. The thin portion 114 having such effect is provided with the expanding portion 160 (recess 162) to suppress a decrease in the stiffness of the entire cover plate 110.

The energy storage device 10 may have an expanding portion (recess) that is different from the expanding portion 160 (recess 162) illustrated in FIG. 6 to FIG. 9. Thus, various modification examples of the expanding portions 160 (recesses 162) will be described below.

Modification Example 1

Figure 10:
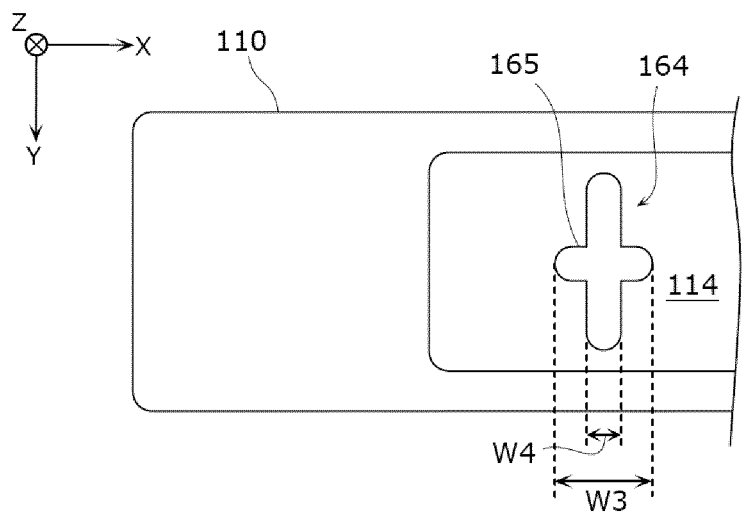
FIG. 10 is a plan view illustrating the shape of a recess in a modification example 1 of the embodiment.
Figure 11:
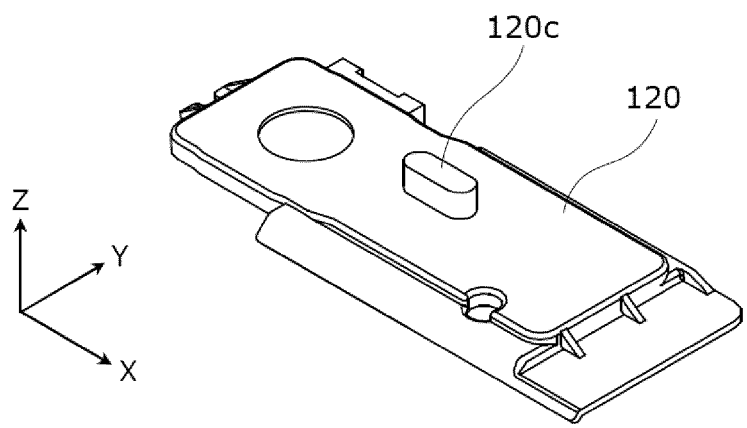
FIG. 11 is a perspective view illustrating the outer appearance of a lower insulating member in the modification example 1 of the embodiment.

FIG. 10 is a plan view illustrating a recess 164 in a modification example 1 of the embodiment. FIG. 10 is a view illustrating the cover plate 110 when viewed from below (negative side of the Z-axis direction). FIG. 11 is a perspective view illustrating the outer appearance of the lower insulating member 120 in the modification example 1 of the embodiment.

The recess 164 illustrated in FIG. 10 has a limiting portion 165, and the limiting portion 165 is a portion of the recess 164, and a width W3 in a direction (X-axis direction in this modification example) crossing the depth direction (Z-axis direction in this modification example) is larger than a width W4 of a remaining portion of the recess 164. In this point, the recess 164 is similar to the recesses 162 in the embodiment as illustrated in FIG. 8.

However, the limiting portion 165 in this modification example is provided in a portion of the recess 164 so as to form a noncircular hole in a plan view (when viewed from the negative side of the Z-axis direction in FIG. 10). That is, as illustrated in FIG. 11, an engaging portion 120c of the lower insulating member 120, which is inserted into the limiting portion 165 and engages therewith, is noncircular in a plan view (when viewed from the positive side of the Z-axis direction in FIG. 11). Specifically, in FIG. 11, the engaging portion 120c is elliptical.

Thus, the engaging portion 120c inserted into the limiting portion 165 is not allowed to rotate about the Z axis. That is, the engaging portion 120c engages with the limiting portion 165 to prevent the lower insulating member 120 from rotating about the Z axis. Therefore, use of the limiting portion 165 and the engaging portion 120c in this modification example can limit the position of the lower insulating member 120 as well as determine and keep the posture of the lower insulating member 120.

Modification Example 2

Figure 12:
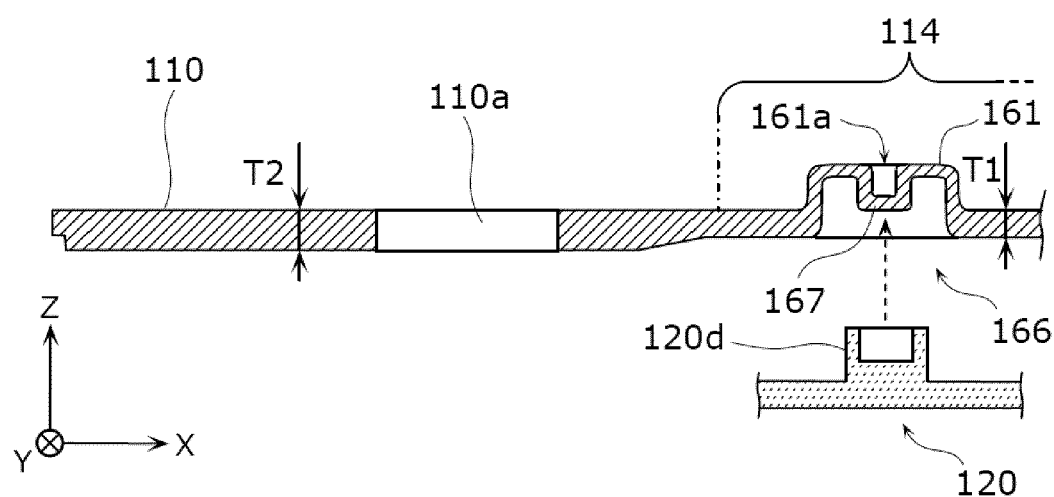
FIG. 12 is a schematic sectional view illustrating a cover plate in a modification example 2 of the embodiment.
Figure 13:
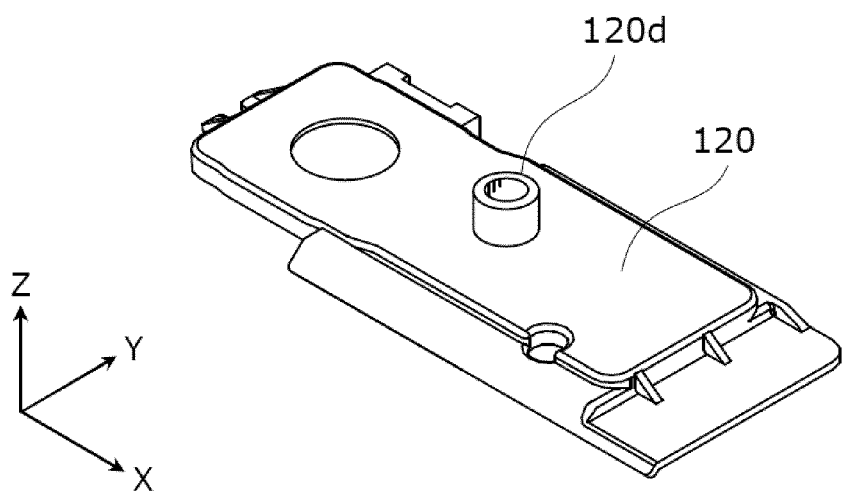
FIG. 13 is a perspective view illustrating the outer appearance of a lower insulating member in the modification example 2 of the embodiment.

FIG. 12 is a schematic sectional view illustrating a cover plate 110 in a modification example 2 of the embodiment. FIG. 12 illustrates the cross section of the cover plate 110 in this modification example, taken along IX-IX in FIG. 8. FIG. 13 is a perspective view illustrating the outer appearance of a lower insulating member 120 in the modification example 2 of the embodiment.

The cover plate 110 in FIG. 12 has an expanding portion 161. The expanding portion 161 expands toward the outside of the case 100 (the positive side of the Z-axis direction in FIG. 12). In this point, the expanding portion 161 is similar to the expanding portions 160 in the embodiment. Thus, the expanding portion 161 can engage with the upper insulating member disposed on the upper face of the cover plate 110 to limit the position of the upper insulating member.

The shape of the expanding portion 161 in a plan view is not specifically limited, and may be circular. Also in this case, the expanding portion 161 can engage with the upper insulating member 125 to limit the position of the upper insulating member 125.

A concave recess 166 is formed on the back side of the entire expanding portion 161, and a part of the recess 166 engages with the lower insulating member 120 to limit the position of the lower insulating member 120.

Specifically, as illustrated in FIG. 12, the expanding portion 161 in this modification example is provided with a cavity 161a depressed toward the inside of the case 100 (the negative side of the Z-axis direction in FIG. 12). This forms a convex part that protrudes toward the inside of the case 100 in a portion of the recess 166 (position on the back side of the cavity 161a), and the convex part functions as a limiting portion 167. Describing in more detail, as illustrated in FIG. 12 and FIG. 13, an engaging portion 120d of the lower insulating member 120 in this modification example has a hole into which the limiting portion 167 is inserted. The limiting portion 167 is inserted into the hole of the engaging portion 120d, and the engaging portion 120d engages with the limiting portion 167 that is a portion of the recess 166.

That is, in the embodiment, the engaging portion 120b protrudingly formed on the lower insulating member 120 is inserted into the concave limiting portion 163, thereby engaging the engaging portion 120b with the limiting portion 163. Conversely, in this modification example, the limiting portion is inserted into the engaging portion.

A portion (the limiting portion 167 in this modification example) of the recess 166 depressed in the cover plate 110 may protrude toward the inside of the case 100, and the protruded portion may engage with the lower insulating member 120 to limit the position of the lower insulating member 120.

The cavity 161a provided in a portion of the expanding portion 161 may engage with the upper insulating member to limit the position of the upper insulating member. That is, the upper insulating member may have a convex part that can be inserted into the cavity 161a in terms of size and shape, as the engaging portion.

For example, a portion of the expanding portion 161, which corresponds to the cavity 161a, may expand upward (toward the positive side of the Z-axis direction in FIG. 12) to form a further expanded portion on the expanding portion 161. In this case, the further dented portion (sub-recess) is formed in a portion of the recess 166. Then, an engaging portion protruding from the lower insulating member 120 may be inserted into the sub-recess as a portion of the recess 166, thereby limiting the position of the lower insulating member 120.

Other Embodiments

The energy storage device of the present invention has been described with reference to the embodiment. However, the present invention is not limited to the embodiment. Various modifications of the embodiment and any combination of the above-mentioned components that could be devised by those skilled in the art fall within the scope of the present invention, unless they are deviated from the subject matter of the present invention.

For example, the number of electrode assembly 400 of the energy storage device 10 is not limited to one, and may be two or more. When the energy storage device 10 has the plurality of electrode bodies 400, as compared to the case where one electrode assembly 400 is stored in the case 100 having the same volume, dead space at corners of the case 100 can be reduced. In turn, the ratio of the electrode assembly 400 in the volume of the case 100 can be increased to increase the capacity of the energy storage device 10.

The electrode assembly 400 of the energy storage device 10 is not necessarily a wound-type one. The energy storage device 10 may have a stacked-type electrode assembly formed by stacking, for example, flat plates. The energy storage device 10 may have an electrode assembly formed by repeatedly making an accordion fold a long band-like plate.

The positional relation between the tab 410 on the positive electrode side and the tab 420 on the negative electrode side in the electrode assembly 400 is not specifically limited. For example, in the wound-type electrode assembly 400, the tab 410 may be opposed to the tab 420 in the winding axis direction. When the energy storage device 10 has the stacked-type electrode assembly, the tab on the positive electrode side and the tab on the negative electrode side may protrude in different directions when viewed in the stacking direction.

In the case 100, the expanding portions 160 may be provided in any wall other than the cover plate 110. For example, when the positive electrode terminal 200 or the positive electrode current collector 140 as the conductive member is disposed on the lower wall of the case 100 (wall forming the bottom face of the main body 111), the expanding portions 160 may be provided on the lower wall. In this case, for example, the insulating member disposed between the lower wall and the positive electrode terminal 200 or the positive electrode current collector 140 may engage with the expanding portion 160 or a portion (limiting portion 163) of the recess 162, which is formed on the back side of the expanding portion 160, thereby limiting the position of the insulating member.

When the shape of the expanding portions 160 is noncircular in a plan view, the shape of the expanding portions 160 may be any shape other than the shape illustrated in FIG. 6. The shape of the expanding portions 160 in plan view may be prismatic or elliptical. In either case, the expanding portion 160 can engage with the upper insulating member 125 (135) to limit the position and posture of the upper insulating member 125 (135).

In this embodiment, the expanding portions 160 expand toward the outside of the case 100. However, the expanding portions 160 may expand toward the inside of the case 100. That is, the cover plate 110 may be provided with the recess 162 depressed from the outer face of the cover plate 110 toward the inside of the case 100.

In this case, for example, the upper insulating member 125 may have a projection on the side of the cover plate 110, and the projection as an engaging portion may engage with the limiting portion 163 that is a portion of the recess 162 to limit the position of the upper insulating member 125.

For example, the lower insulating member 120 may have a recess opened to the cover plate 110, and the recess as an engaging portion may engage with the expanding portion 160 to limit the position of the lower insulating member 120.

In other words, the upper insulating member 125 may be a first insulating member having the first engaging portion that engages with the limiting portion 163 as a portion of the recess 162, and the lower insulating member 120 may be a second insulating member having the second engaging portion that engages with the expanding portion 160.

The cover plate 110 may have no expanding portion, and the limiting portion is disposed on a recess formed by partially depressing the cover plate 110. With this configuration, since the recess limits the position of the lower insulating member, and the lower insulating member is merely provided with the engaging portion that engages with only the limiting portion as a portion of the recess, the lower insulating member can be reduced in weight.

The electrode assembly 400 may have no tabs 410 and 420. That is, for example, the electrode assembly 400 may have an active material-uncoated portion protruding in the winding axis direction, and the active material-uncoated portion may be connected to an electrode terminal via a current collector. Also in this case, the same effects as in the embodiment can be achieved.

INDUSTRIAL APPLICABILITY

The present invention can be applied to energy storage devices such as a lithium ion secondary battery.

The invention claimed is:

1. An energy storage device, comprising:
    an electrode assembly including a main body, a positive electrode tab, and a negative electrode tab, the positive electrode tab and the negative electrode tab protruding from the main body;
    a case configured to store the electrode assembly;
    a conductive member electrically connected to one of the positive electrode tab and the negative electrode tab;
    a first insulating member disposed between a wall of the case and the conductive member in a first direction; and
    a projection protruding in the first direction on the wall on an opposite side to the first insulating member,
    wherein, in the first direction, the positive electrode tab and the negative electrode tab are provided on a same side of the main body,
    wherein the positive electrode tab and the negative electrode tab are provided in a row in a second direction perpendicular to the first direction,
    wherein the first insulating member includes a first engaging portion configured to engage with a limiting portion, the limiting portion being a portion of a recess formed on the wall on an opposite side to the projection, and
    wherein, when viewed from the first direction, a length of the projection in a third direction perpendicular to the first direction and the second direction is more than a width of the projection in the second direction.

2. The energy storage device according to claim 1, further comprising a second insulating member disposed on the wall on the opposite side to the first insulating member,
    wherein the projection is noncircular when viewed in the first direction, and
    wherein the second insulating member includes a second engaging portion configured to engage with the projection.

3. The energy storage device according to claim 2, wherein the projection protrudes toward an outside of the case, wherein the conductive member comprises a current collector disposed in the case, the current collector being configured to electrically connect the electrode assembly to an electrode terminal fixed to the case, wherein the first insulating member is at least partially disposed between the current collector and an inner face of the wall, wherein the second insulating member is at least partially disposed between the electrode terminal and an outer face of the wall, and wherein the projection is long in the third direction when viewed in the first direction.

4. The energy storage device according to claim 1, wherein the limiting portion comprises a portion of the recess, and has a larger width than a width of a remaining portion of the recess in a direction crossing a depth direction.

5. The energy storage device according to claim 1, wherein the wall has a thin portion, and wherein the projection is provided on a part of the thin portion.

6. The energy storage device according to claim 1, wherein the electrode assembly is formed by winding an electrode, and wherein the projection is formed on the wall presenting in a winding axis direction of the electrode assembly in the case so as to protrude opposite to the electrode assembly.

7. The energy storage device according to claim 1, wherein the case includes an electrode terminal, and wherein the projection and the first engaging portion do not overlap with the electrode terminal when viewed in the first direction.

8. The energy storage device according to claim 1, wherein the projection longitudinally extends in the third direction when viewed in the first direction.

9. The energy storage device according to claim 1, wherein, in the first direction, the first engaging portion overlaps with the projection.

10. The energy storage device according to claim 1, wherein the case includes an electrode terminal extending above the wall, and wherein, in the first direction, the projection and the first engaging portion are located outside of the electrode terminal.

11. The energy storage device according to claim 1, wherein the case includes an electrode terminal extending above the wall, and wherein, in the first direction, the first engaging portion is located outside of the electrode terminal.

12. The energy storage device according to claim 1, wherein, in the first direction, the positive electrode tab and the negative electrode tab protrude from a top surface of the main body toward the wall.

* * * * *